Dec. 22, 1959

J. G. RUCKELSHAUS 2,917,814

RESISTANCE TIME MEASURING DEVICES

Filed June 7, 1952

INVENTOR.
JOHN G. RUCKELSHAUS
BY
Dicke and Padlon
ATTORNEYS

Dec. 22, 1959  J. G. RUCKELSHAUS  2,917,814
RESISTANCE TIME MEASURING DEVICES
Filed June 7, 1952  2 Sheets-Sheet 2
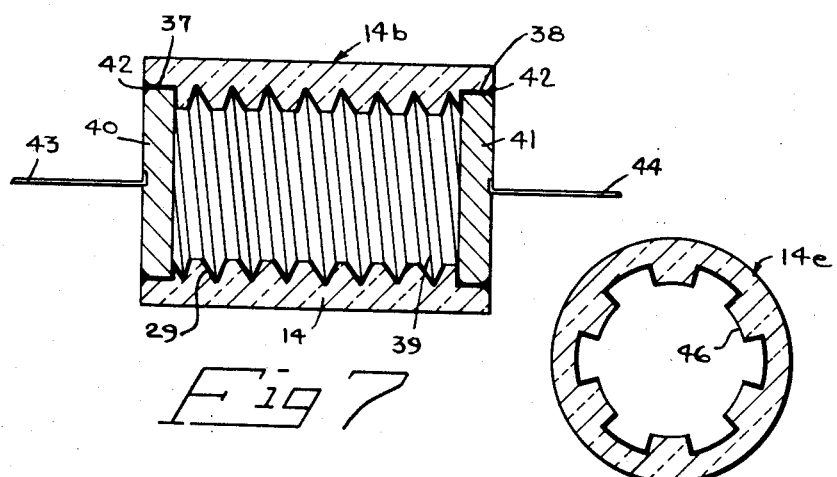
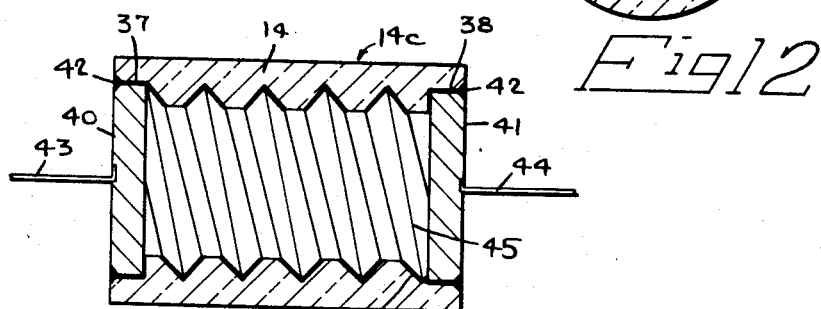
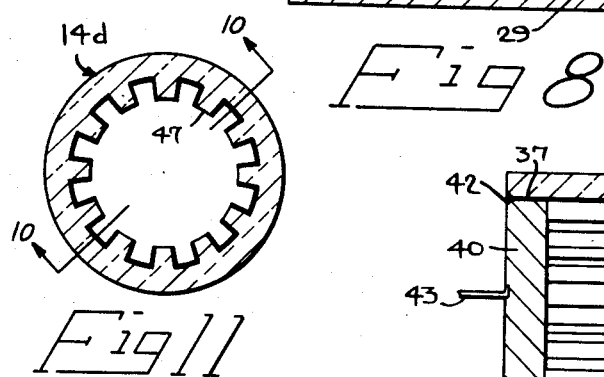
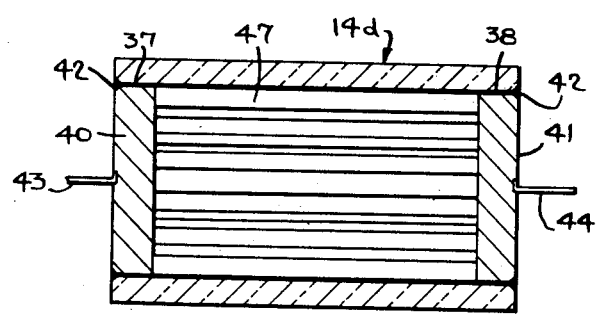
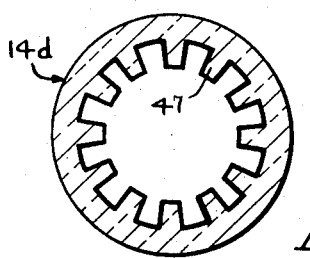
INVENTOR.
JOHN G. RUCKELSHAUS
BY
Dicke and Padlon
ATTORNEYS { # United States Patent Office

2,917,814
Patented Dec. 22, 1959

2,917,814

RESISTANCE TIME MEASURING DEVICES

John G. Ruckelshaus, Madison, N.J.

Application June 7, 1952, Serial No. 292,367

14 Claims. (Cl. 29—155.5)

This invention relates to resistance time measuring devices and, more particularly, to a resistance unit in which the value of resistance is changed in direct proportion to the number of hours it is connected to a source of electrical energy.

At present, when it is desired to keep a record of the number of hours an electrical device is operated over a period of time, two methods are most commonly employed. First, a log or record is kept and, each time the equipment is turned on and off, the time is recorded. Second, a timer, consisting of a form of electric clock movement, is connected with the equipment so that, each time it is turned on, the clock movement actuates recording means which registers the total amount of time that the device has operated. The first method is time consuming on the part of the operator and involves the human element since some one must always enter the time and do it accurately. The second method is comparatively expensive, bulky, and adds considerable weight to the equipment whiceh is objectionable if the device is airborne equipment.

My invention relates to a method of measuring the time that an electrical or, in fact, any device is operated, which requires neither the keeping of a log or the use of a clock mechanism.

An object of my invention is to provide a simple, low cost, and accurate device which, when connected to an electrical appliance, or other form of electrical or electronic equipment, will record accurately the number of hours that said appliance or equipment is or has been operating.

Another object of my invention is to provide a resistor unit which may be installed into an electrical device and, after connections have been made to it, said resistance unit can be accurately adjusted to any desired resistance value.

Still another object of my invention is to provide a metal film resistance unit that is stable and has a lower temperature co-efficient of resistance than previously used resistors of deposited carbon film.

A further object of my invention is to provide a simple, low cost, accurate, hermetically sealed, precision metal film resistor.

One further object of my invention is to provide a resistor comprising an insulating tube whose interior is glazed with a metalliferous surface and has terminal conductors at sealed ends thereof.

Another object of my invention is to provide a method of coating a non-conducting member, the thickness of the coating depending on the desired electrical resistance, with a film of conductive material and hermetically sealing the ends thereof and connecting the ends with conductors.

Still another object of the invention is to provide a method of and means for manufacturing a resistor unit on a mass production basis at low cost.

Other objects and features of my invention will become apparent from the following detailed description, taken in connection with the accompanying drawings, in which:

Figs. 7 and 8 are sectional views of modifications of the embodiments shown above;

Fig. 9 shows a cross section with splines, the inner surfaces being coated before reaming;

Fig. 10 is a longitudinal section taken on line 10—10 of Fig. 11;

Fig. 11 is a cross section with splines after reaming; and

Fig. 12 is a modification of the embodiment shown in Fig. 11 and has fewer splines.

Referring now to the drawings in which similar reference characters denote like parts throughout, I show the following:

Figure 1:
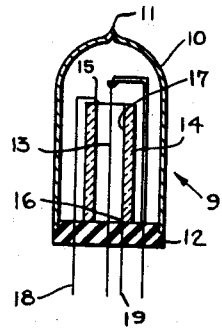
Fig. 1 is a sectional view of preferred means used in my invention.
Figure 2:
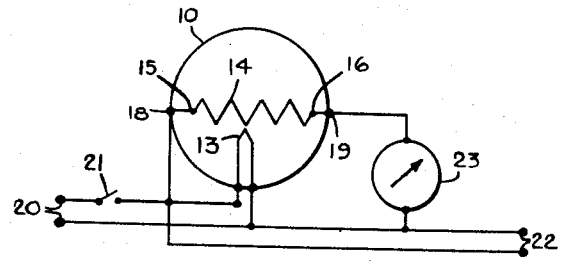
Fig. 2 is a schematic view of my embodiment used in a circuit.

In Fig. 1 a unit 9 is provided with a glass envelope 10 with a sealing off tip 11. Said envelope 10 has a base 12 in which is mounted a filament 13 surrounded by a glazed ceramic or glass cylinder 14. Said cylinder 14 is provided with contacts 15 and 16 embedded into it at each end on the inner wall 17 of said cylinder. These contacts 15 and 16 are connected to wires 18 and 19 running through the base 12. The unit 9 is then attached to a vacuum pump, not shown, and a high vacuum in the order of $10^{-5}$ atmosphere is obtained. The unit is then sealed at tip 11 and connected into the equipment in which it is to be used, as shown in Fig. 2 where lines 20 lead from a source of current. A switch 21 controls the filament of the device as well as the equipment 22 into which it is installed. A milliammeter 23 is connected in circuit with contact terminals 15 and 16 of the device and a source of current also controlled by said switch 21. When switch 21 is closed, current flows in the circuit containing the contacts 15 and 16 of cylinder 14 and the milliammeter 23. It is a well known physical law that, when a filament such as Nichrome or some other alloy, is lighted or heated in a container encasing a high vacuum, the metal will evaporate or sublimate and deposit either on the inner walls of the container or onto other objects which may be in said vacuum. The amount of material evaporated or sublimated is in proportion to the heat of the filament and the length of time that the filament is heated or lighted. It can then be seen that, as the metal is evaporated and deposited on the cylinder 14, a deposit of the metal will form evenly between contacts 15 and 16. These are in circuit with milliammeter 23 and a source of electrical current will start to pass current as soon as a resistance path is created between 15 and 16. The milliammeter dial is calibrated in hours so that, at first, when a very high resistance path appears between contacts 15 and 16, a low number of hours is recorded. As the filament 13 continues to burn, more and more metal is evaporated onto cylinder 14 thus creating a lower and lower resistance path between contacts 15 and 16. This continues for a predetermined period, say 1,000 hours, when the resistance path is such that its low resistance causes the milliammeter to read full scale. At this time, either a new resistance element can be installed in the equipment, causing the meter to again start reading at the low end of the scale, i.e., the high resistance of the unit, or a shunt can be switched into the circuit across the meter and the time then recorded on another calibrated scale on the meter.

Figure 3:
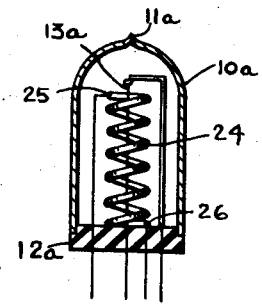
Fig. 3 is a sectional view of a modified embodiment of Fig. 1.
Figure 4:
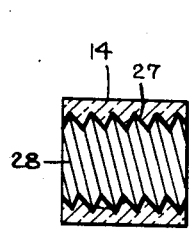
Fig. 4 is a sectional view before reaming.
Figure 5:
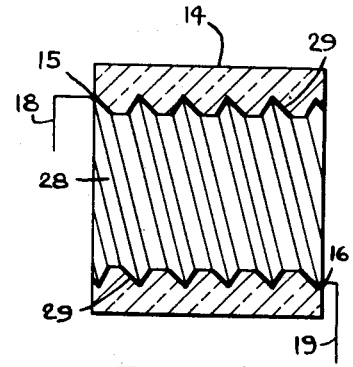
Fig. 5 is an enlarged view showing details of products made according to and forming part of my invention.

Should it be desired to record great lengths of time and employ a very sensitive element, a helix of glass or ceramic can be employed instead of the cylinder 14. This would allow for a much longer path of resistance between the contacts, as shown in Fig. 3, where 10a is a glass envelope and 11a is a sealing off tip. On base 12a is mounted a filament 13a and a glazed ceramic or glass helix 24 supported by wires on terminals 25 and 26 running through base 12a. Each end of the helix 24 is metallized with platinum or some other good electrical conducting material which also makes contact with the wires leading through the base 12a. The operation of this device is identical with that shown in Fig. 1 with the exception that, in Fig. 1, a short film is evaporated over the entire inner surface of a cylinder while, in Fig. 3, it is evaporated in the form of a long helical path.

By manufacturing a device of this type, care must be take to produce a resistance film that is stable and one that has a low temperature co-efficient of resistance; in fact, one that is far superior to the well known carbon deposited films. It has been found that, by using a nickel-chromium alloy commonly known by the trade name of Nichrome V or Tophet A, such a film can be obtained. The resulting film from such nickel alloy has a much more acceptable temperature co-efficient than the alloy before being evaporated. This is because the two metals evaporate at slightly different times, the nickel coming off first, resulting in a slightly different alloy from the original. It has also been found that, in order to make a stable resistor by this method, highly glazed ceramic or glass must be used. In the case of making carbon deposited film resistors, just the opposite is the case.

In addition to the above metals, I may employ pure metals or alloys thereof for coating the cylinders or helices above indicated. It has been found that a pure Nichrome alloy, free of impurities such as iron and/or aluminum, has produced a very stable unit or resistor.

The above mentioned unit has many other applications besides the one above referred to. For example, it can be installed in electrical equipment without the milliammeter and supplied with a calibration chart showing what the resistor will read after a certain number of operational hours. An ohm meter or resistance bridge can be placed across the terminals 15 and 16, shown in Fig. 2, or 25 and 26, shown in Fig. 3. Resistance readings can then be checked against the chart in order to determine the number of hours the unit has been in operation.

Another unique application is that it can be used as an accurate fixed resistor by installing it into a circuit, then, after it is installed, run the filament until the exact resistance is obtained. The filament can then be disconnected and a hermetically sealed precision resistor remains.

It can readily be seen that many resistors can be strung onto one filament, and said filament 13 or 13a heated or lighted so as to create several resistors at a time. These can be removed from the envelope 10 or 10a and terminals 18 and 19 attached, thus economically forming a stable metal film resistor of extremely low temperature co-efficient of resistance. In this case, the ends can be filled with a casting material, such as is shown in Figs. 7 and 8, in order to hermetically seal the resistance element.

Figure 6:
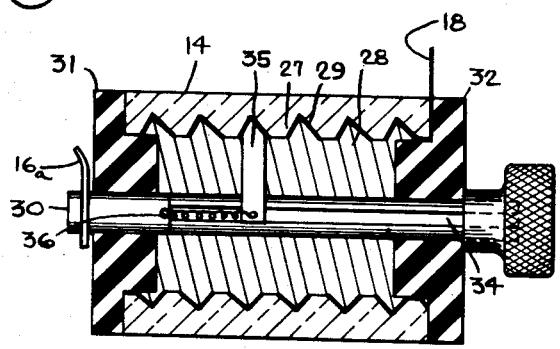
Fig. 6 is a detailed sectional view of a modification of a helio potentiometer or potentiometer as used in the circuit shown in Fig. 2.

In order to manufacture a resistor with high resistance values for use as film resistors of this type, the helix employed, as shown in Fig. 3, may be made in the form of a thread cut on the inside wall 17 of the cylinder 14. After evaporation, the surface of the thread can be reamed and the helix of resistance material will result. Instead of accurately evaporating the metal, as in Fig. 2, metal can be deposited to a value lower than required, then, by connecting the unit across a Wheatstone bridge or similar apparatus, careful adjustment of the unit can be made by the amount of material reamed off. This unit can then have lug or wire terminals attached to each end and sealed, or a shaft carrying a moving contact can be inserted so that the unit can be used as a potentiometer or rheostat, such as is shown in Fig. 6, wherein cylinder 14 is a glazed ceramic or glass tube on the inner surface 27 of which a thread 28 has been cut and a metal film 29 evaporated as described above. Shaft 30 is supported by insulating bearing 31 and insulating bearing 32, attached to cylinder 14. The shaft 30 has a groove 34 running its length. In said groove 34 is a movable contact member 35 which engages the helix coating 29 of alloy evaporated on cylinder 14. As shaft 30 is turned, the contact 35 follows the helix 29 and slides along groove 34. A flexible wire 36 connects contact 35 to spring contact terminal 16a through a metal tip on shaft 30. As shaft 30 is turned, a variable resistance is thus obtained between terminal 16a and lead 18.

In the modification in Fig. 7, there is shown a resistor 14b in which the cylinder 14, made of ceramic or other suitable non-conducting material is provided with platinum coated terminal recesses or undercuts 37 and 38, respectively. Such undercuts permit forming or reaming of a fine thread 39 in the cylinder without the reamer, during the reaming operation, touching the platinum coating or film. In this manner, a fine thread for high ohmage is produced. Also, such undercuts provide a space for snugly fitting cup terminals 40 and 41, respectively, which are forced or swaged into said undercuts. It will be noted that said cups form a seal with the undercuts by means of soldering 42. Each of said cups 40 and 41 is provided with a lead wire 43 and 44, respectively.

In the modification shown in Fig. 8, resistor 14c is provided with a coarse thread showing a helix with a coarse thread 45 for a relatively moderate ohmage. Each of said threads 39 and 45 is coated with an electricity conducting medium as herein indicated. In other respects, said resistors 14b and 14c are alike.

The resistor is made by first threading the interior of cylinder 14, and may then be undercut as shown in Figs. 7 and 8 to the depth of the thread. The cylinder is then glazed and fired, after which the undercuts are coated with platinum or other metal paste up to the thread ends. The cylinders are then fired and baked. Next the alloy is then evaporated onto the interior of the cylinder 14, as shown in Figs. 1 and 3, masking off the undercut with platinum so that the alloy film contacts platinum on first and last thread in the cylinder. The thread is reamed to the desired resistance as shown, by a Wheatstone bridge or other suitable instrument. Once the desired ohmage has been obtained, the cups 40 and 41, carrying their respective lead wires, are forced into the respective undercuts and solder applied to the platinum to hermetically seal the unit.

In the modifications shown in Figs. 9 and 10, there are illustrated cylinders 14d and 14e, respectively, each of which contains longitudinal splines. In cylinder 14e there are provided a plurality of coarse splines 46 which, when coated according to my invention, provide relatively moderate ohmage or resistance, whereas, in cylinder 14d, the splines 47 are fine, i.e., greater in number and permit of high ohmage.

It is to be noted that one of the major advantages of producing relatively pure nickel-chrome alloy resistors, according to the invention above described, is that great amounts of these materials will be saved. For example, when one megohm wire wound resistors are manufactured under the armed services JAN 93 specification, only 40 units per pound are obtained. Approximately 10% of the wire used is scrapped in the calibration process. Fine enamelled wire, such as .0015", used in these wire wound resistors, is very difficult to manufacture and very expensive. Resistors made according to my invention have bare wire of approximately .010" diameter which is easy to manufacture and costs approximately 10% of that used on wire wound resistors. Also, a better resistor results.

A comparison of the temperature co-efficient of resistance of the three types most widely used in producing precision resistors, namely, wire wound, deposited carbon film, boron carbon, and my new type is made herein. The comparisons are tabulated in order to show the advantage of employing my method of evaporation in the production of resistance units. It should be noted that, although Nichrome V is used as the filament in my process, the deposited metal film is far better in being of lower co-efficient than the original Nichrome V.

*Parts per million change in resistance per degree C. temperature*

| Resistance Value | Boron Carbon Resistor | Deposited Carbon Resistor | Nichrome Wire Resistor | Nichrome V Wire Resistor | Evaporated Nickel Chrome Alloy, Pure |
| --- | --- | --- | --- | --- | --- |
| 10 ohms | 50 |  | 170 | 130 | 30 |
| 100 ohms | 80 | 280 | 170 | 130 | 30 |
| 1,000 ohms | 100 | 310 | 170 | 130 | 30 |
| 30,000 ohms | 100 | 330 | 170 | 130 | 50 |
| .1 megohm | 150 | 350 | 170 | 130 | 60 |
| 0.5 megohm | 175 | 375 | 170 | 130 | 80 |
| 1.0 megohm | 200 | 400 | 170 | 130 | 100 |

In addition to the above mentioned features that tend to create a very high grade stable resistance unit, my resistor is also encased in a non-hygroscopic shell of either glazed ceramic or glass or other suitable material, whereas the other types above referred to are normally deposited or wound on the outside of tubes or rods and the resistance elements covered with varnishes and the like, which varnishes do not protect the element or hermetically seal it as does the method by which my units are made. A glazed surface for evaporating is necessary in order to obtain a stable resistance element.

From the foregoing description, taken in connection with the accompanying drawings, it will be noted that, by my invention, I provide a resistor having a film of nickel-chrome alloy deposited on the inner wall of a glazed or unglazed ceramic, glass or similar type of tube on which a metal terminal material has been baked or otherwise deposited at each end. Furthermore, there is provided a ceramic tube in which grooves have been cut either in the form of a helix or parallel splines having metal terminals deposited at each end of the tube, and a metallic film is deposited on the inside of the tube so as to form a resistance path between the metal terminals. The metal film may be removed from the inside diameter of the grooves or threads so as to form threads of resistance material in one case and parallel resistance paths between the metal terminals in the second, said removal being dependent upon the amount of resistance desired or needed, but approximately the same amount of material will always be removed from all parts. This differs from other patents where a carbon mass is deposited on a tube and a cutter cuts a helix of resistance material out of the solid mass up to a point where the desired resistance value is obtained. This may be half or a quarter of the way across the length of the tube, putting all the strain on that part which is cut. In my invention the entire length is adjusted evenly.

Also, a resistor is provided having metal end terminals forced into the ends of tubes and electrically connected to the terminal bands so as to form a hermetically sealed resistor unit inside of the tube.

By my invention, very low resistance values are obtained by using coarse splines from end to end and, for higher values, finer splines. A coarse thread running from end to end in the tube will produce a higher value than the splines, a finer thread a still higher value, and a very fine thread, a still higher resistance value. By using the different depth threads and splines, it is not necessary to cut the ceramic away. Enough alloy is removed to produce the desired resistance value. Thus, I cut no more from a very fine thread to produce a very high value than I do from a coarse one to produce a low value.

As to stability in resistors, I have found that, by using nickel-chromium alloy substantially free of any impurities, there is practically no voltage co-efficient of resistance whereas, in other types of filaments, this is a factor. Also, over five temperature cycles of −60° C. to 150° C., the drift of my resistor is generally under about 0.2%. In carbon filament resistors, it is often 1% or more.

As to the deposited film formed in the cylinders, the thickness may vary depending on the need and use and may be anywhere from one micron to forty microns and, in some cases, greater.

It will be noted that in the description of the invention, the term evaporation has been used. This term is intended to cover sublimation wherein the particles of the heated filament are transferred from the filament to the member being coated.

While preferred embodiments of my invention have been illustrated and described, it is to be understood that modifications as to form, arrangement of parts and use of materials may be made without departing from the spirit and scope of the invention as claimed herein.

I claim:

1. The method of producing electro-conducting film resistors comprising placing a non-conducting hollow member in a vacuum chamber, running a wire mask in the form of a spiral from end to end inside the hollow member in said chamber, and a metal filament extending lengthwise through the center of the mask in the hollow member, evaporating metal from the filament and depositing the same on the inside of the hollow member in the form of a continuous film, whereby, when the hollow member is removed, a helical resistor element will result, then attaching terminals to each end of the resistor element and finally sealing the ends of the member so as to provide a hermetic seal for the resultant resistance element.

2. The method of producing electro-conducting film resistors comprising placing a non-conducting hollow member in a vacuum chamber, running a wire mask in the form of a spiral from end to end inside the hollow member in said chamber, and a metal filament extending lengthwise through the center of the mask in the hollow member, evaporating the metal filament and depositing the same on the inside of the hollow member, whereby, when the hollow mask is removed, a resistor element having a temperature co-efficient of resistance of not more than 0.0003% per degree C. temperature up to 30 ohms and not more than 0.0008% per degree C. temperature up to 0.5 megohm will result, then attaching terminals to each end of the resistor element and finally sealing the ends of the member so as to provide a hermetic seal for the resultant resistance element.

3. A method of producing a metal film resistor comprising inserting an insulating tube element having an internal helical thread into a vacuum chamber, extending alloy wire filament axially through the thread, heating said filament whereby metal from the filament passes onto the helical thread in the inner surface of the tube, attaching terminals to each end of the resultant film, adjusting the resistance of the element by reaming the interior of the element to a helical element to be formed of sufficient cross section to produce the desired resistance, and finally sealing the ends of the element to produce a hermetic seal for the resultant element.

4. A method of producing a metal film resistor having a co-efficient of resistance of not more than 0.0003% per degree C. temperature up to 30 ohms and not more than 0.0008% per degree C. temperature up to 0.5 megohm, comprising inserting an insulating tube element having an internal groove forming a helical thread therein into a vacuum chamber, extending a wire filament axially through the tube element and holding the same in a relatively fixed position, heating said filament and evaporating metal from the filament onto the thread in the inner surface of the tube, attaching terminals to each end of the resultant film, adjusting the resistance of the element by reaming the interior of the element to a helical element to be formed of sufficient cross section to produce the desired resistance, and finally sealing the ends of the element to produce a hermetic seal for the resultant element.

5. A method of producing a metal film resistor comprising inserting an insulating tube element having an internal helical groove into a vacuum chamber, extending a wire filament through the element, heating said filament and evaporating metal from the filament onto the inner surface of the tube, attaching terminals to each end of the resultant film, adjusting the resistance of the element by reaming the interior of the element to a helical element to be formed of sufficient cross section to produce the desired resistance, and finally sealing the ends of the element.

6. A method of producing a metal film resistor having a co-efficient of resistance of not more than 0.003% per degree C. temperature up to 30 ohms and not more than 0.0008% per degree C. temperature up to 0.5 megohm, comprising inserting an insulating tube element having a helical thread into a vacuum chamber, extending a wire filament through the thread and holding the same in axial position relative of the thread, heating said filament and evaporating metal from the filament onto the inner surface of the tube, attaching terminals to each end of the resultant film in the element, adjusting the resistance of the element by reaming the interior of the element to a helical element to be formed of sufficient cross section to produce the desired resistance, and finally sealing the ends of the element.

7. The method of producing a metal film resistor having a low temperature co-efficient comprising threading a surface of a substance selected from the group consisting of ceramic, porcelain, and glass, glazing and firing the surface, adding terminals to the surface, then firing and baking the surface, transferring onto the formed thread an alloy to form a superimposed film of thread thereon and, the terminals, and then adjusting the resistance of the thread of alloy and finally sealing said surface.

8. A method of making an electrical resistance element, which method comprises placing a tubular member of insulating material into a chamber, inserting a metal alloy filament through the said member, evacuating and causing an electric current to flow through the filament, the magnitude of the current being sufficient to heat the filament to a temperature at which the metal from the filament is transferred onto the proximate surface of said member removing the member from the chamber, and cutting the proximate service of said member whereby an electroconductive band is formed inside said member.

9. The method according to claim 8 wherein the tubular member has a helical thread formed on the inner wall of said member.

10. The method according to claim 8 wherein the coated proximate surface of said member is splined forming continuous bands of electro-conductive material on the proximate surface of said member.

11. The method of producing electro-conducting film resistors comprising placing a ceramic hollow carrier in a vacuum chamber, running a metal filament extending lengthwise through the hollow carrier, evacuating the chamber, passing electricity through the filament to heat the same to a point where metal from the filament evaporates and deposits on the inside of the hollow carrier in the form of a continuous film, forming a helical design in the film, then attaching terminals to each end of the resistor element and finally sealing the ends of the member so as to provide a hermetic seal for the resultant resistance element.

12. The method of producing electro-conducting film resistors on which metallic end terminals having been fired, comprising placing a ceramic hollow carrier in a vacuum chamber, running a metal filament extending lengthwise through the hollow carrier, evacuating the chamber, passing electricity through the filament to heat the same to a point where metal from the filament evaporates and deposits on the inside of the hollow carrier and said end terminal, in the form of a continuous film, releasing the vacuum in said chamber, forming a helical design in the film so that a helical resistor element will result, then attaching terminals to each of the end terminals of the resistor element and finally sealing the ends of the member so as to provide a hermetic seal for the resultant resistance element.

13. In resistor manufacture, the steps of providing a tubular body of non-conducting material with a helical groove and an intervening helical rib in the inner peripheral surface thereof, exposing the grooved surface to a metal member heated to vaporization temperature thus to deposit a continuous coating of metal on the surface, removing the deposited metal from such helical rib so that the metal left in the groove forms a helical resistance element, and further substantially uniformly removing the top portions of such rib while measuring the resistance of such element, thereby to reduce the groove depth and hence the cross-sectional area of the element until the desired resistance value is obtained, and sealing the ends of the tubular body.

14. In resistor manufacture, the steps of providing a tubular body of non-conducting material with a groove in its inner peripheral surface, exposing such surface to vaporized metal thus to deposit a continuous coating of metal on the surface, removing the deposited metal from the ungrooved portion of such surface, removing portions of the coated surface on the sides of the groove to reduce the depth of the groove and hence the cross-sectional area of the metal left therein while measuring the resistance of the latter, the area thus being reduced until the desired value of resistance is obtained, and sealing the ends of the tubular body.

References Cited in the file of this patent

UNITED STATES PATENTS

| | | |
|---|---|---|
| 1,606,153 | Douglas | Nov. 9, 1926 |
| 1,832,466 | Means | Nov. 17, 1931 |
| 2,100,045 | Alexander | Nov. 23, 1937 |

FOREIGN PATENTS

| | | |
|---|---|---|
| 517,586 | France | Dec. 20, 1920 |
| 461,275 | Great Britain | Feb. 15, 1932 |

OTHER REFERENCES

Heritage, "Metal Film Resistors," Electronic Engineering, July, 1952, pages 324–7.